US006832387B2

(12) United States Patent
Grooters et al.

(10) Patent No.: US 6,832,387 B2
(45) Date of Patent: *Dec. 14, 2004

(54) SYSTEMS, METHODS, AND SOFTWARE FOR USING MARKERS ON CHANNEL SIGNALS TO OPERATE ELECTRONIC PROGRAM GUIDES AND RECORDING DEVICES

(75) Inventors: Brandon A. Grooters, Watauga, TX (US); Gary E. Sullivan, Mansfield, TX (US)

(73) Assignee: Gateway, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/360,373

(22) Filed: Feb. 7, 2003

(65) Prior Publication Data

US 2003/0118326 A1 Jun. 26, 2003

Related U.S. Application Data

(63) Continuation of application No. 09/470,038, filed on Dec. 22, 1999, now Pat. No. 6,549,718.

(51) Int. Cl.$^7$ ............................................. H04N 5/445
(52) U.S. Cl. ........................................ 725/39; 386/83
(58) Field of Search ............................. 386/83, 46, 95; 72/39, 40, 58, 42, 141, 142; H04N 5/445

(56) References Cited

U.S. PATENT DOCUMENTS

| | | | | |
|---|---|---|---|---|
| 4,787,063 A | * | 11/1988 | Muguet | 386/83 |
| 4,963,994 A | | 10/1990 | Levine | 358/335 |
| 5,485,219 A | | 1/1996 | Woo | 348/460 |
| 5,579,055 A | | 11/1996 | Hamilton et al. | 348/476 |
| 5,585,866 A | | 12/1996 | Miller et al. | 348/731 |
| 5,588,866 A | | 12/1996 | Rothenberger | 439/372 |
| 5,699,107 A | | 12/1997 | Lawler et al. | 348/13 |
| 5,699,125 A | | 12/1997 | Rzeszewski et al. | 348/563 |
| 5,734,513 A | | 3/1998 | Wang et al. | 359/742 |
| 5,751,282 A | | 5/1998 | Girard et al. | 345/327 |
| 5,754,258 A | | 5/1998 | Hanaya et al. | 348/734 |
| 5,805,763 A | | 9/1998 | Lawler et al. | 386/83 |
| 5,815,145 A | | 9/1998 | Matthews, III | 345/327 |
| 5,822,123 A | | 10/1998 | Davis et al. | 348/564 |
| 5,844,595 A | | 12/1998 | Blatter et al. | 348/12 |
| 5,867,208 A | | 2/1999 | McLaren | 348/13 |
| 6,141,488 A | | 10/2000 | Knudson et al. | 386/83 |
| 6,173,112 B1 | | 1/2001 | Gruse et al. | 386/83 |
| 6,226,444 B1 | | 5/2001 | Goldschmidt Iki et al. | 386/83 |
| 6,400,406 B1 | | 6/2002 | Kim | 348/460 |

OTHER PUBLICATIONS

"A Beginner's Guide to HTML", http://www.ncsa.uiuc.edu/General/Internet/WWW/HTMLPrimerPrintable.html, (Nov. 24, 1999), 1–25.

* cited by examiner

*Primary Examiner*—Vincent Boccio
(74) *Attorney, Agent, or Firm*—Ross F. Hunt, Jr.; Stites & Harbison PLLC

(57) ABSTRACT

Convergence systems, or PC-TV systems, provide the combined benefits of a computer system and a television. These systems typically include audio/video recorders, such as VCRs, for recording programs, as well as an electronic program guide (EPG) for presenting program information. The present invention provides methods and devices for detecting specific signals or markers associated with a program or channel signal, and then enabling a recording device or an EPG to perform an act, such as recording a program, based upon the detected signals or markers. In a preferred embodiment, the system receives a channel signal, detects a program start or stop marker within the signal, and controls the EPG or the recording device to perform acts corresponding to the detection of a start or stop instruction.

22 Claims, 3 Drawing Sheets

US 6,832,387 B2

SYSTEMS, METHODS, AND SOFTWARE FOR USING MARKERS ON CHANNEL SIGNALS TO OPERATE ELECTRONIC PROGRAM GUIDES AND RECORDING DEVICES

RELATED APPLICATION

This application is a continuation under 37 C.F.R. 1.53(b) of U.S. patent application Ser. No. 09/470,038 filed Dec. 22, 1999 now U.S. Pat. No. 6,549,718 which application is incorporated herein by reference.

FIELD OF THE INVENTION

The present invention concerns information handling systems, and more specifically, interaction between personal computer/television convergence systems, electronic program guides (EPGs), and audio/video recording devices.

BACKGROUND OF THE INVENTION

The home electronics industry, in the midst of an ongoing convergence of televisions and computers, has produced a new class of products, known as personal computer/television systems, or PC-TV systems. In their simplest form, these systems allow users to selectively switch between using a video monitor or display to watch television, or to support computer activities like word processing, creating spread sheets, playing computer games, or even surfing the internet. A seminal example, the Gateway Destination PC-TV system, from Gateway Inc., not only weds a television to a personal computer, but allows system expansion to receive programming from internal sources, such as video-cassette recorders (VCRs), digital versatile disk (DVD) players, laser disk players, and video cameras, as well as from external sources, such as cable, direct-broadcast satellite, etc.

The Destination, and other such systems, additionally include an automatic recording feature which allows users to instruct VCRs to automatically record specific upcoming television programs, days, weeks, or even months before they actually occur. The instructions typically designate a channel, a start time, and an end time, and the system logs, or registers, the instructions for future execution. Once registered, the system automatically selects the designated channel, as well as the starting and ending the recording at the designated times.

With the growth in the number of video channels, particularly cable and satellite television channels, many PC-TV systems now include an electronic program guide—a database listing available television channels and their program schedules. In these systems, an EPG operates as a user-prompted menu system, which logically organizes and displays thousands of program options. Typically, the user uses a wireless remote control to prompt display of EPG data, such as name, start time and end time, for a program currently being viewed. When the current program ends, the user, again using the remote control, can prompt display of EPG data for the next program. Additionally, the user can scroll through a listing of programs in the EPG data and select a program for recording using a record command. Selecting the record command automatically programs a VCR coupled to the EPG with the necessary channel, start time, and end time information.

Despite the utility and convenience of the EPG itself and its VCR-programming capability, PC-TV systems still suffer from at least two problems. The first problem is that the initiation of an EPG data display for any given program requires user input. This requirement typically means that the EPG is generally underemployed. The second problem is that the VCR clock that controls the starting and stopping of recording is too often either a few minutes behind or a few minutes ahead of the clock of a television broadcaster. Under these conditions, the VCR programmed to record a program either starts and stops recording before a desired program does, or starts and stops recording after the program does so. In either case, the resulting recording misses a portion of the desired program.

The user can ameliorate the recording timing problem in two ways. First, the user can program the VCR to start recording a few minutes earlier and end recording a few minutes later to ensure recording of the entire program, but this is generally inconvenient and wasteful of recording tape. And second, the user can spend extra time and effort to ensure synchronization of the VCR clock with the television broadcast clock. Although these measures often successfully avoid the timing problem, they generally fail when a broadcaster delays or interrupts a scheduled program with unscheduled programming, such as a special news report, or when a broadcaster lets a scheduled program, such an overtime football or basketball game, runs past its scheduled end time.

Accordingly, there is a need for a better way of controlling display or output of EPG data and a better way of controlling VCRs and other recording devices to record desired programming.

SUMMARY OF THE INVENTION

To address these and other problems, the present invention comprises methods and devices that detect specific signals or markers associated with a broadcast signal, and operate a recording device or an EPG based upon the detected signals or markers. Specifically, one exemplary method entails receiving a broadcast signal, detecting a program start or stop marker within the signal, and controlling the EPG or the recording device based upon this program start or stop marker information.

More specifically, operating the EPG entails initiating display or output of a first data set associated with a program upon detection of the program start marker, and initiating display of a second data set associated with another program upon detection of the program stop marker. Operating the recording device entails starting a recording of a program upon detection of the start marker, and stopping recording upon detection of the end marker.

Other embodiments, aspects, and advantages of the invention will become apparent after considering the accompanying drawings and the following detailed description.

DESCRIPTION OF PREFERRED EMBODIMENTS

The following detailed description, which references and incorporates FIGS. 1–3B, describes and illustrates specific embodiments of the invention. These embodiments, offered not to limit but only to exemplify and teach the invention, are shown and described in sufficient detail to enable those skilled in the art to practice the invention. Thus, where appropriate to avoid obscuring the invention, the description may omit certain information known to those of skill in the art.

Figure 1:
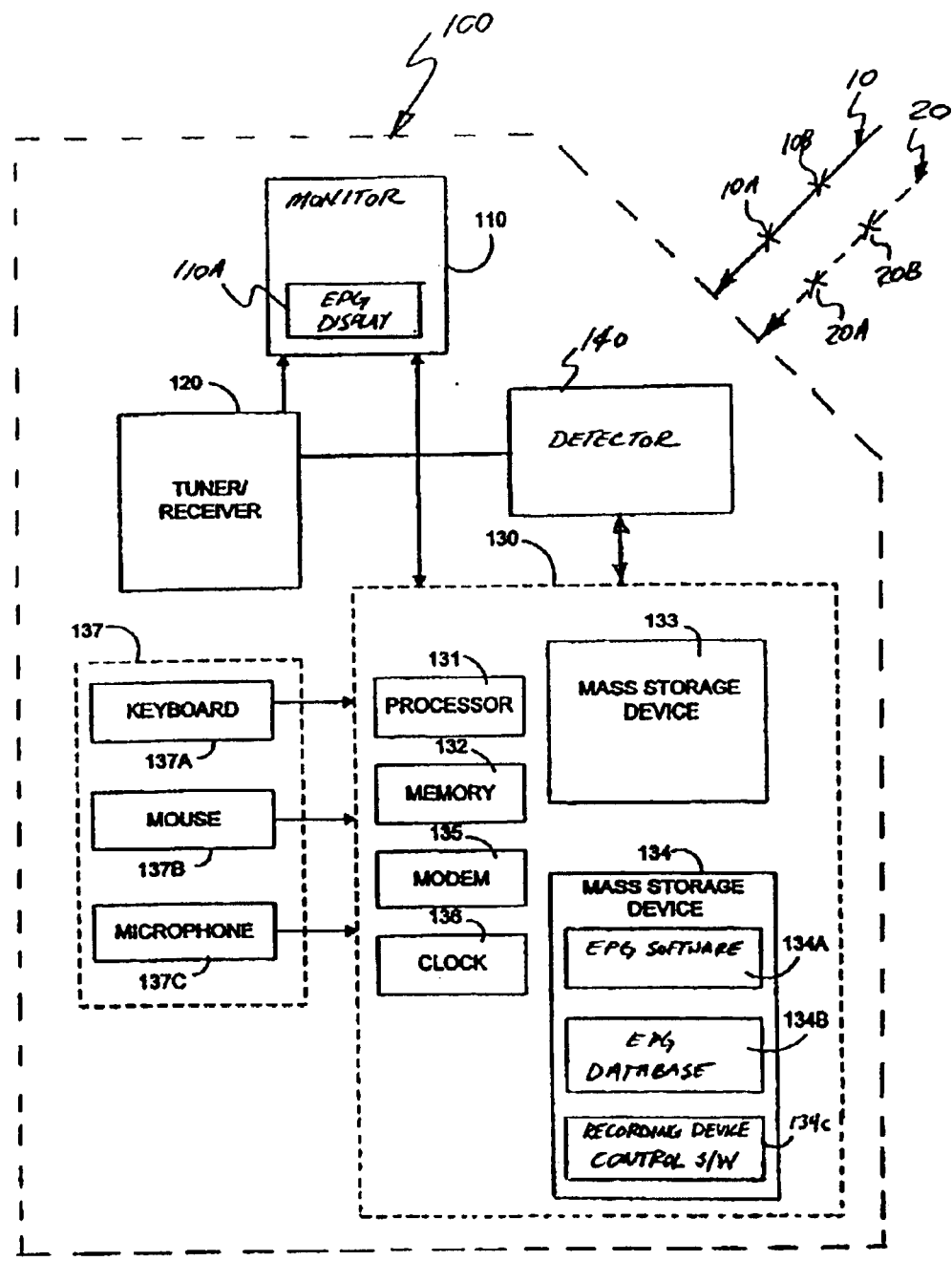
FIG. 1 is a block diagram of an exemplary PC-TV system incorporating the present invention.

FIG. 1 shows an information handling system comprising a convergence (or PC-TV) system 100 in accord with the invention. Specifically, PC-TV system 100, which in a preferred embodiment, incorporates features of the Destination PC-TV system from Gateway, Inc., includes a monitor 110, a tuner-receiver 120, a personal computer 130, and a detector 140.

Monitor 110, the heart of the system from a user perspective, plays or displays video programming from the tuner-receiver 120 and/or personal computer 130. Monitor 110 includes an EPG display 110A for displaying EPG information. Monitor 110 also includes built-in audio speakers (not shown) for outputting audible signals, including audible EPG signals. To facilitate audible EPG signals, the system includes a toggle or mixing circuit (not shown) to allow for output of EPG audio over, or in place of, normal program audio.

Tuner-receiver 120 receives analog or digital channel signals via direct connection or wireless coupling to a multi-channel programming source. The signals for a given channel carry a scheduled or unscheduled sequence of programs, or programming events. In an exemplary embodiment, tuner-receiver 120 accepts digital or analog cable television signals, local over-the-air broadcast signals, and direct satellite television signals. Exemplary signals that tuner-receiver 120 can receive include a program or channel signal 10 with embedded markers 10*a* and 10*b* and/or a parallel channel signal 20 with embedded markers 20*a* and 20*b*. In an exemplary embodiment, markers 10*a* and 10*b* and markers 20*a* and 20*b* identify the respective beginning and end of a program on channel signal 10 and 20 respectively.

Computer 130, operatively coupled to monitor 110 and tuner-receiver 120, includes a processor 131, a local memory 132, mass data storage devices 133 and 134, a modem 135, a clock 136, and a set of user interface devices 137. Modem 135, and other available means of communication, are capable of supporting apparatus and/or software (not shown), such as streaming-media players for any current or future format.

Interface devices 137 include a keyboard or keypad 137A, a mouse or other pointing device 137B, and a microphone 137C, all of which support user interaction with a graphical user interface, such as the Windows operating system from Microsoft. In some embodiments, one or more of the interface devices 137 may be wireless.

Mass data storage device 133, for example a computer-controllable video cassette recorder (VCR), a hard drive, or other recording device, records audio, video, or digital data on a read-write, data-storage medium, such as a magnetic recording tape. However, the invention encompasses any device capable of recording data, whether in analog or digital form.

Mass data storage device 134 may include one or more hard drives, and store an electronic program guide (EPG) software 134A and related database 134B, as well as recording-device-control software 134C. EPG software 134A and recording-control software 134C cooperate with detector 140 to respectively control EPG display 110*a* and mass storage device 133.

Detector 140, which is operatively coupled to receive a version of channel signal 10 and/or channel signal 20 from tuner-receiver 120 or modem 135, identifies and decodes markers 10A and 10B and/or markers 20A and 20B. In one embodiment, these markers are contained in vertical blanking intervals (VBIs) of a television channel signal. In another, they are contained in digital data packets of a digital television signal or a digital media stream received via modem 135, which is coupled through a local or wide area network to a provider of programming marked in accord with the invention. In still other embodiments, the markers are carried by a digital or analog communication channel, such as signal 20, that is distinct from channel signal 10, but that provides markers synchronized with the programs of channel signal 10.

In general operation, system 100 receives channel signal 10 and/or channel signal 20 via tuner-receiver 120 or modem 135. Detector 140 identifies a marker 10A, using identification information embedded within the marker and/or using logical or contextual inference based on the channel and time information within EPG database 134B, as a start marker for a given program. Once a marker is identified and/or decoded, detector 140 sends a signal to computer 130, which directs EPG software to output EPG data to EPG display 10A and/or directs mass storage device 133 to start or stop recording a program scheduled for recording.

Figure 2:
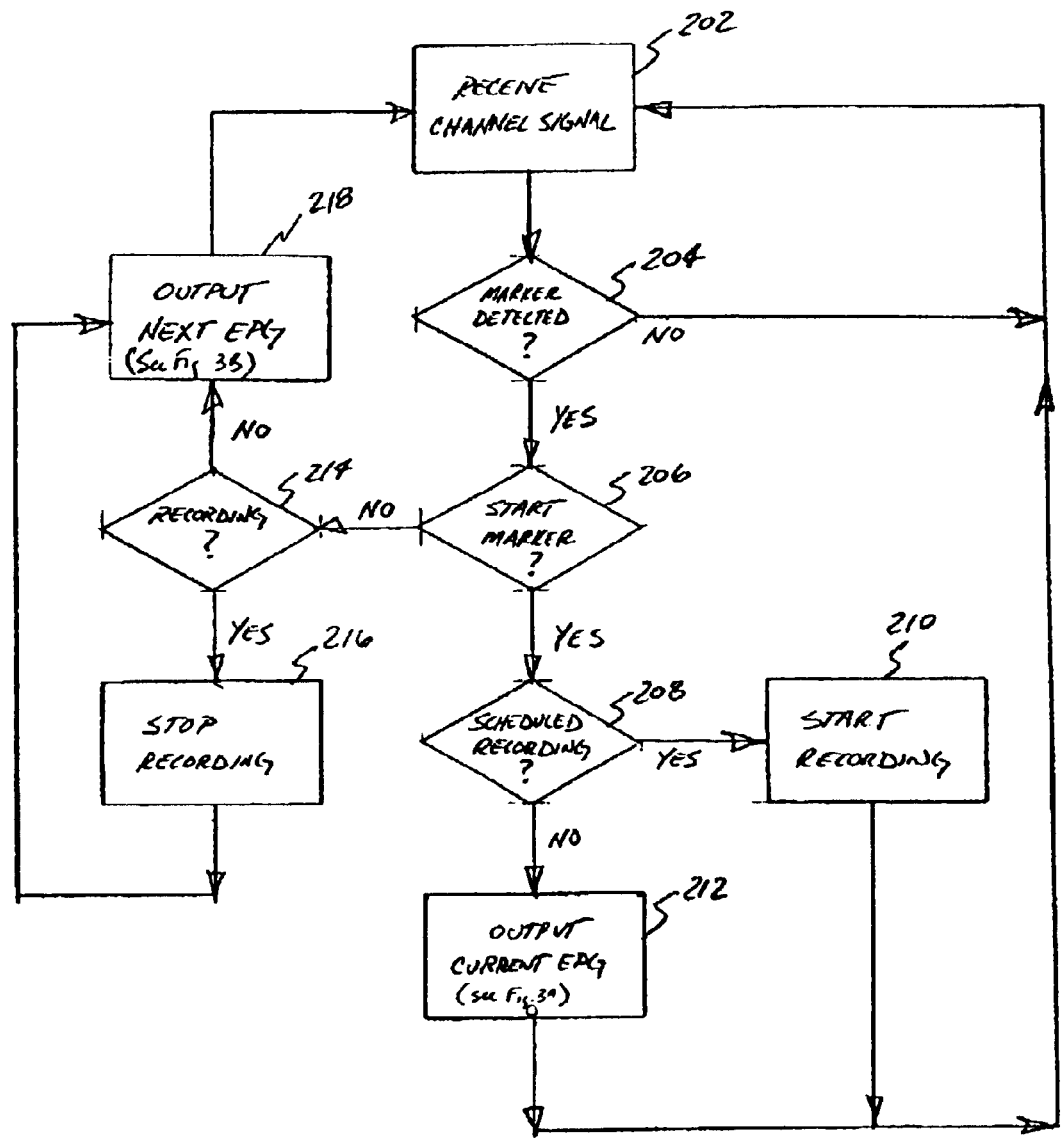
FIG. 2 is a flowchart illustrating exemplary operation of an EPG within the system of FIG. 1.

More particularly, FIG. 2 shows an exemplary method of operation in at least a portion of EPG software 134A. The method begins at block 202 with receipt of channel signals 10 and/or 20. Channel signal 20, which is generally unnecessary if channel signal 10 includes markers 10A and 10B, is a shadow signal that provides markers for programs on channel signal 10. Execution of the exemplary method then proceeds to process block 204.

Process block 204 determines whether detector 140 has identified any markers associated with channel signals 10 and 20. If no markers have been detected, then the method loops back to block 202. However, if a marker has been detected, execution proceeds to decision block 206.

In decision block 206, the system determines whether the detected marker is a program start marker. The exemplary embodiment assumes the marker is either a program start marker or a program stop marker. However, other embodiments check for alternative types of markers, such as commercial start and stop markers, which would bracket a commercial occurring during a program. Embodiments that check for commercial markers can mark the location of commercials on recording media and/or skip initial recording of the commercials, or provide a commercial-only recording mode. Embodiments that accept streaming media check for a wide variety of markers consistent with the format of the a given media stream, one or more of which can be validly interpreted to control operation of an EPG or a recording device. The streaming media can assume any available or future streaming media format. Media formatted according to Hypertext Mark-up Language (HTML), a Virtual Hypertext Markup Language (VHTML), or X Mark-up Language (XML) can also be processed in alternative embodiments of the invention. In any case, if the detected marker is a program start marker, execution branches to decision block 208.

Decision block 208 determines whether the current program associated with the start marker is scheduled for recording. In an exemplary embodiment, this entails consulting a scheduling database associated with recording-device-control software 134C, for example, EPG database 134B. If the program associated with the start marker is scheduled for recording, execution proceeds to process block 210, which starts the recording. In some embodiments, the start marker precedes actual starting of the program by some predetermined time period, such as 5 or 10 seconds, or by a time period indicated in the marker itself. If the marker does proceed the start in this fashion, these embodiments queue the recording device to start at an appropriate time to capture at least the actual start of the program. After block 210, execution returns to block 202.

If decision block 208 determines that the program associated with the detected start marker is not scheduled for recording, execution proceeds to process block 212, which outputs at, least a portion of any EPG data for the program associated with program start marker. In an exemplary embodiment, this specifically entails searching EPG database 134B (or a remote database on another network accessible computer) based on available channel and time information, or based on other information provided in or with the program start marker, such as a program identifier. In any event, once the appropriate data (which can take a wide variety of forms, such as text, audio, and/or video information) is located, the EPG software directs its output at one or more appropriate portions on the monitor 110, such as EPG display 110A. Execution then returns to block 202.

At block 206, if the detected marker is determined not to be a start marker, but instead to be a program stop marker for its associated program, execution branches or proceeds to decision block 214. At this decision block, the exemplary embodiment determines whether the program associated with the detected stop marker is currently being recorded by the system. One way of determining this is to check the status of mass storage device 133 or any other recording devices coupled to system 100. If the program associated with the program start is currently being recorded, execution proceeds to block 216 to stop the recording.

In some embodiments, the stop marker precedes actual stopping of its associated program by some predetermined time period, such as 5 or 10 seconds, or by a time period indicated in the marker itself. If the marker does proceed the stop in this fashion, these embodiments queue the recording device to stop at an appropriate time to ensure capture of at least the end of the program.

If the program (or programs) associated with the stop marker are being recorded, and after execution of block 216, the exemplary method continues with execution of process block 218. Block 218 outputs the next EPG data, i.e., outputs at least a portion of any EPG associated with the program following the program associated with the program stop marker on the current channel.

Figures 3A, 3B:
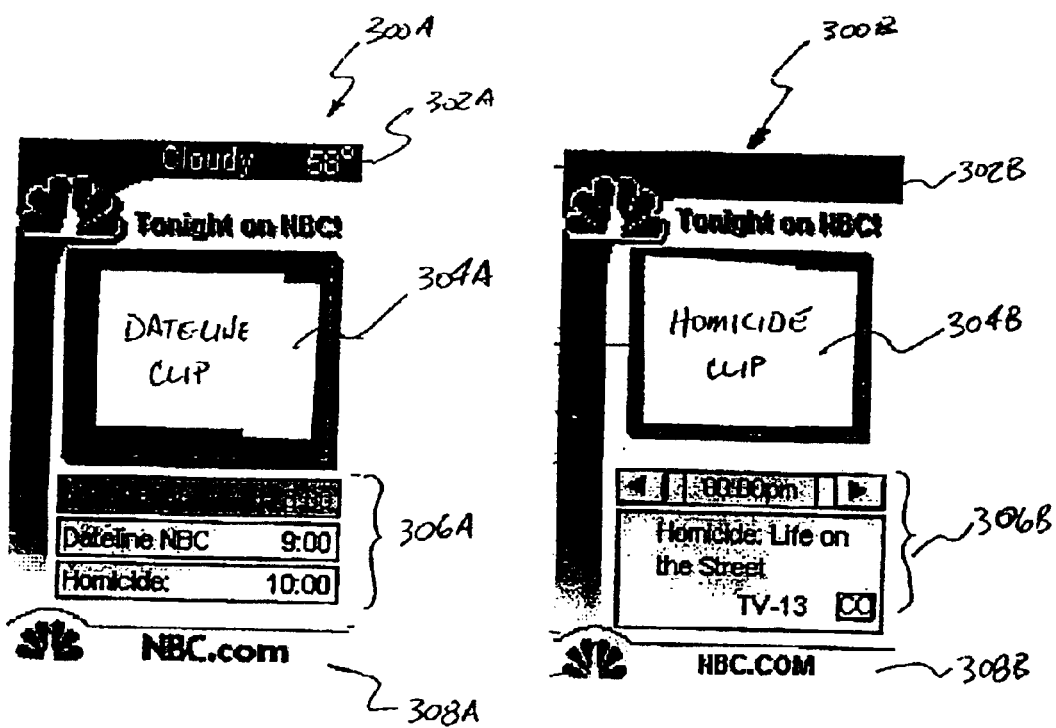
FIG. 3A is a diagram of an exemplary EPG display generated by the system in FIG. 1 in accord with the present invention.
FIG. 3B is a diagram of another exemplary EPG display generated by the system in FIG. 1 in accord with the present invention.

FIGS. 3A and 3B show respective examples of first EPG display 300A for a current program which the system outputs upon detection of a program start marker, and a second EPG display 300B which the system displays after detection of a program stop marker for the current program. Displays 300A and 300B, which also function as graphical user interfaces to EPG data, include respective affiliated data areas 302A and 302B, media area 304A and 304B, preview selection areas 306A and 306B, and back-channel access areas 308A and 308B. Affiliated data areas 302A and 302B display data provided by local network affiliates or cable providers, such as local weather conditions or promotional information. Media areas 304A and 304B display video information, such as program trailers contained within EPG database 134B or imported in real time as streaming media via modem 135. Notably, media area 304A displays a media clip, such a program trailer, for Dateline NBC, the current program, upon detection of a program start marker. On the other hand, media area 304B which is displayed automatically (that is, without user initiation) upon detection of program stop marker for Dateline NBC, displays a media clip for Homicide, which is the program indicated as following after Dateline NBC in FIG. 3B. Selection areas 306A and 306B permit selection of specific EPG data, and back-channel access areas 308A and 308B facilitate access to internet sites related to specific channels or programs.

The preferred embodiments described above are intended only to illustrate and teach one or more ways of practicing or implementing the present invention, not to restrict its breadth or scope. The scope of the invention, intended to encompass all ways of practicing or implementing the principles of the invention, is defined only by the following claims and their equivalents.

What is claimed is:

1. A method of operating a system including an electronic program guide (EPG) having at least first and second program data sets associated with respective first and second programs, the method comprising:
    displaying the first program data set of the EPG;
    detecting a program stop marker in a channel signal or in a signal associated with the channel signal; and
    displaying the second program data set of the EPG in response to detection of the program stop marker.

2. The method of claim 1, wherein the program stop marker includes time information.

3. The method of claim 1, wherein displaying the first program data set comprises displaying the first program data set on a display, and displaying the second program data set comprises displaying the second program data set on the display.

4. The method of claim 1:
    wherein the channel signal carries the first program;
    wherein the method further comprises displaying at least a portion of the first program; and
    wherein the first program data set and a portion of the first program are displayed concurrently.

5. The method of claim 1, wherein the channel signal carries audio or video information.

6. The method of claim 1, wherein the program stop marker is defined within one or more vertical blanking intervals of the channel signal.

7. The method of claim 1, wherein displaying the first or second data set includes displaying at least one of:
    an affiliated data area which provides local weather information or promotional information;
    a media area which provides a program trailer for the second program; and
    a back-channel access area which provides access to Internet sites related to the first or the second program.

8. The method of claim 1, wherein the first data set and the second data are associated with respective first and second programs carried by the channel signal, and the first program precedes the second program.

9. A method of operating a system comprising a recording device and an electronic program guide (EPG), the method further including:
    receiving a channel signal carrying audio or video information;
    detecting a marker in the channel signal or in a signal associated with the channel signal;
    determining whether the detected marker indicates start of a first program in the channel signal;

if the detected marker is determined to indicate start of a first program: determining whether the recording device is scheduled to record the first program;

if the first program is determined to be scheduled for recording, commanding the recording device to start recording of the first program; and if the first program is determined not to be scheduled for recording, commanding the EPG to output a first program data set associated with the first program;

if the detected marker is determined not to indicate start of the first program:

determining whether the recording device is recording the first program;

if the recording device is determined to be recording the first program, commanding the recording device to stop recording the first program; and if the recording device is determined not to be recording the first program, commanding the EPG to output a second program data set associated with a second program.

10. The method of claim 9, wherein the channel signal comprises analog or digital data.

11. The method of claim 9, wherein the channel signal comprises a digital television broadcasting signal.

12. The method of claim 9, wherein the program start marker or the program stop marker is defined within one or more vertical blanking intervals.

13. The method of claim 9, wherein at least one of the program start marker and the program stop marker is carried on a digital signal distinct from the channel signal.

14. The method of claim 9, wherein at least one of the program stop marker and the program start marker includes time information.

15. A method of operating a system comprising a recording device and an electronic program guide (EPG), the method further comprising:

receiving a channel signal carrying audio or video information;

detecting a marker in the channel signal or in a signal associated with the
channel signal; determining whether the detected marker indicates start of a first program in the channel signal;

if the detected marker indicates start of a first program:

determining whether the recording device is scheduled to record the first program;

if the recording device is scheduled to record the first program, starting recording of the first program; and if the first program is determined not to be scheduled for recording, outputting a first program data set associated with the first program;

if the detected marker is determined not to indicate start of a program:

determining whether the recording device is recording the first program;

if the recording device is determined to be recording the first program, stopping the recording device from recording;

if the recording device is determined not to be recording the first program, outputting a second program data set associated with a second program.

16. The method of claim 15, wherein the channel signal comprises analog or digital data.

17. The method of claim 15, wherein the channel signal is a digital television broadcasting signal.

18. The method of claim 15, wherein the program start marker or the program stop marker is defined within one or more vertical blanking intervals.

19. The method of claim 15 wherein at least one of the program start marker and the program stop marker is carried on a digital signal distinct from the channel signal.

20. The method of claim 15, wherein at least one of the program stop marker and the program start marker includes time information.

21. The method of claim 15, wherein outputting the first or second data set includes displaying at least one of:

an affiliated data area which provides local weather information or promotional information;

a media area which provides a program trailer for the second program; and a back-channel access area which provides access to Internet sites related to the first or the second program.

22. The method of claim 15, wherein the first data set and the second data are associated with respective first and second programs carried by the channel signal, and the first program precedes the second program.

* * * * *